Dec. 6, 1955  D. Q. DILLINGHAM  2,725,962
COMBINATION ACCELERATOR, SERVICE AND EMERGENCY
BRAKE CONTROLS AND MOTOR IGNITION CIRCUIT
CUT-OUT FOR AUTOMOTIVE VEHICLES
Filed March 12, 1954  3 Sheets-Sheet 1
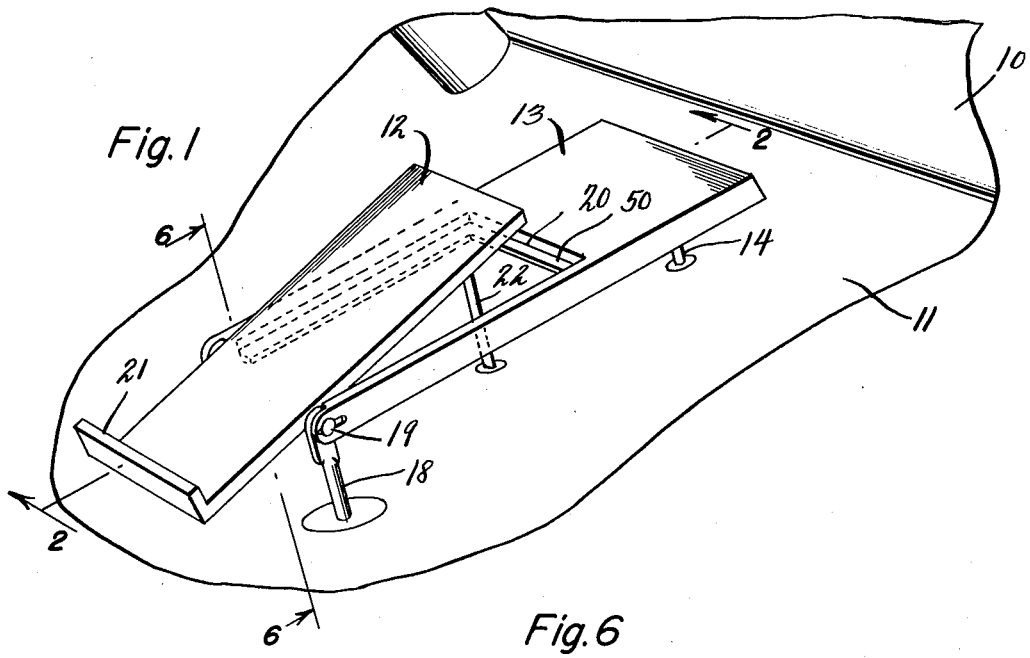
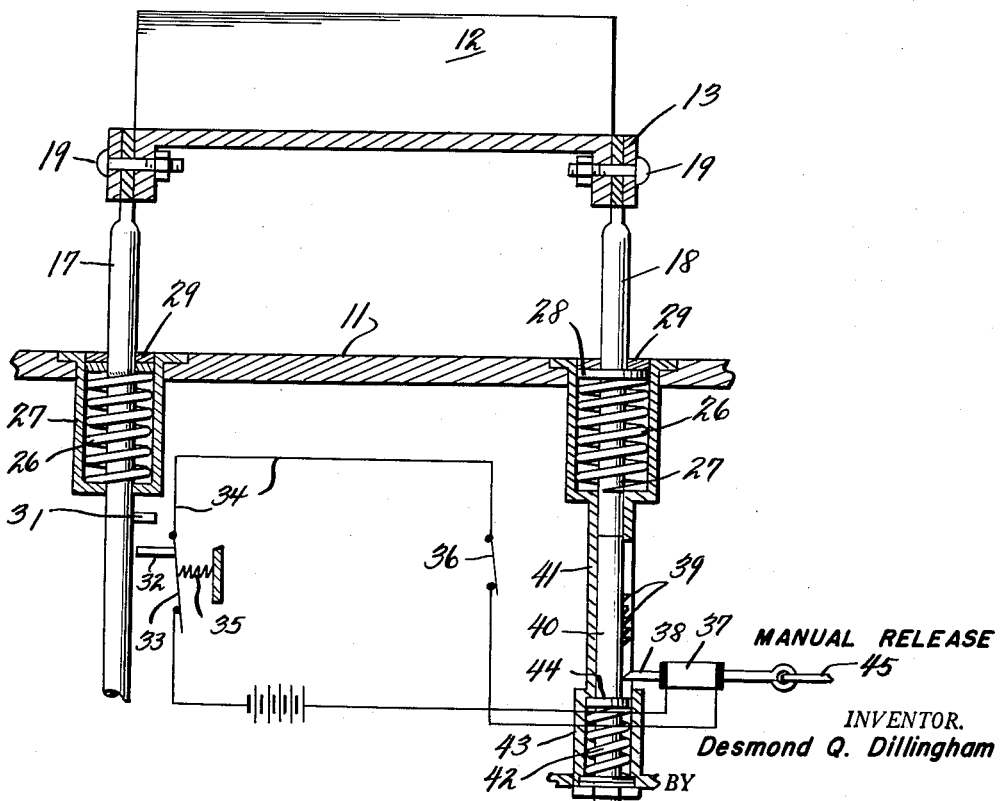
INVENTOR.
Desmond Q. Dillingham
BY
Wilkinson & Mawhinney
ATTORNEYS Dec. 6, 1955          D. Q. DILLINGHAM          2,725,962
COMBINATION ACCELERATOR, SERVICE AND EMERGENCY
BRAKE CONTROLS AND MOTOR IGNITION CIRCUIT
CUT-OUT FOR AUTOMOTIVE VEHICLES
Filed March 12, 1954          3 Sheets-Sheet 2
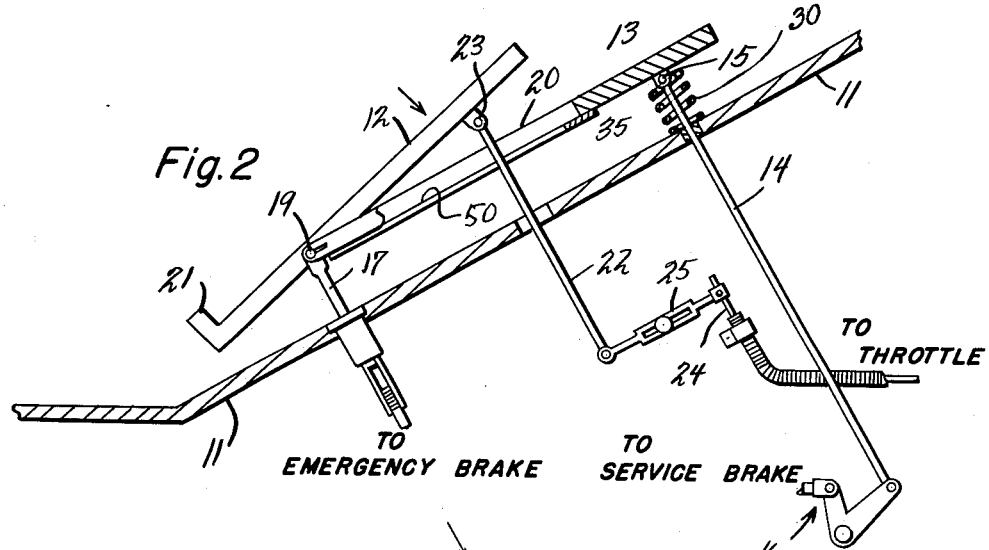
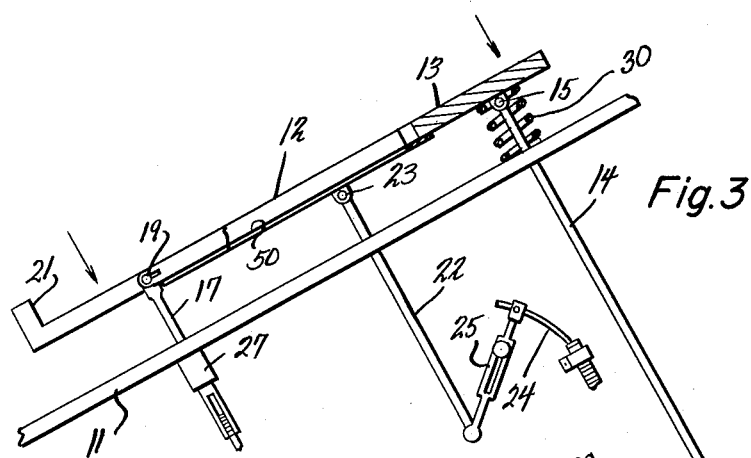
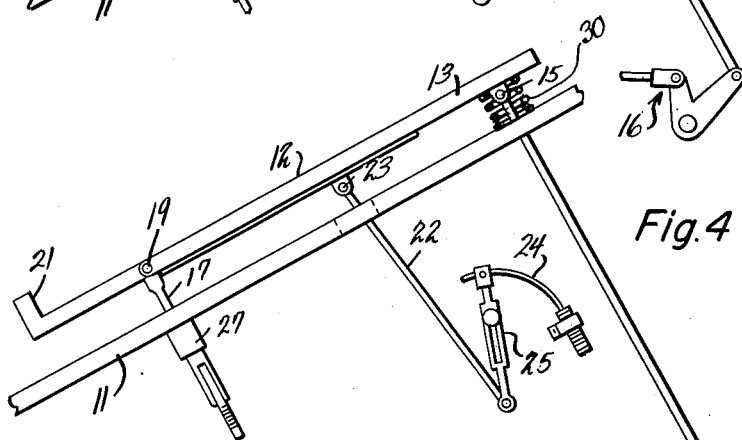
INVENTOR.
Desmond Q. Dillingham
BY Wilkinson + MacKinney
ATTORNEYS

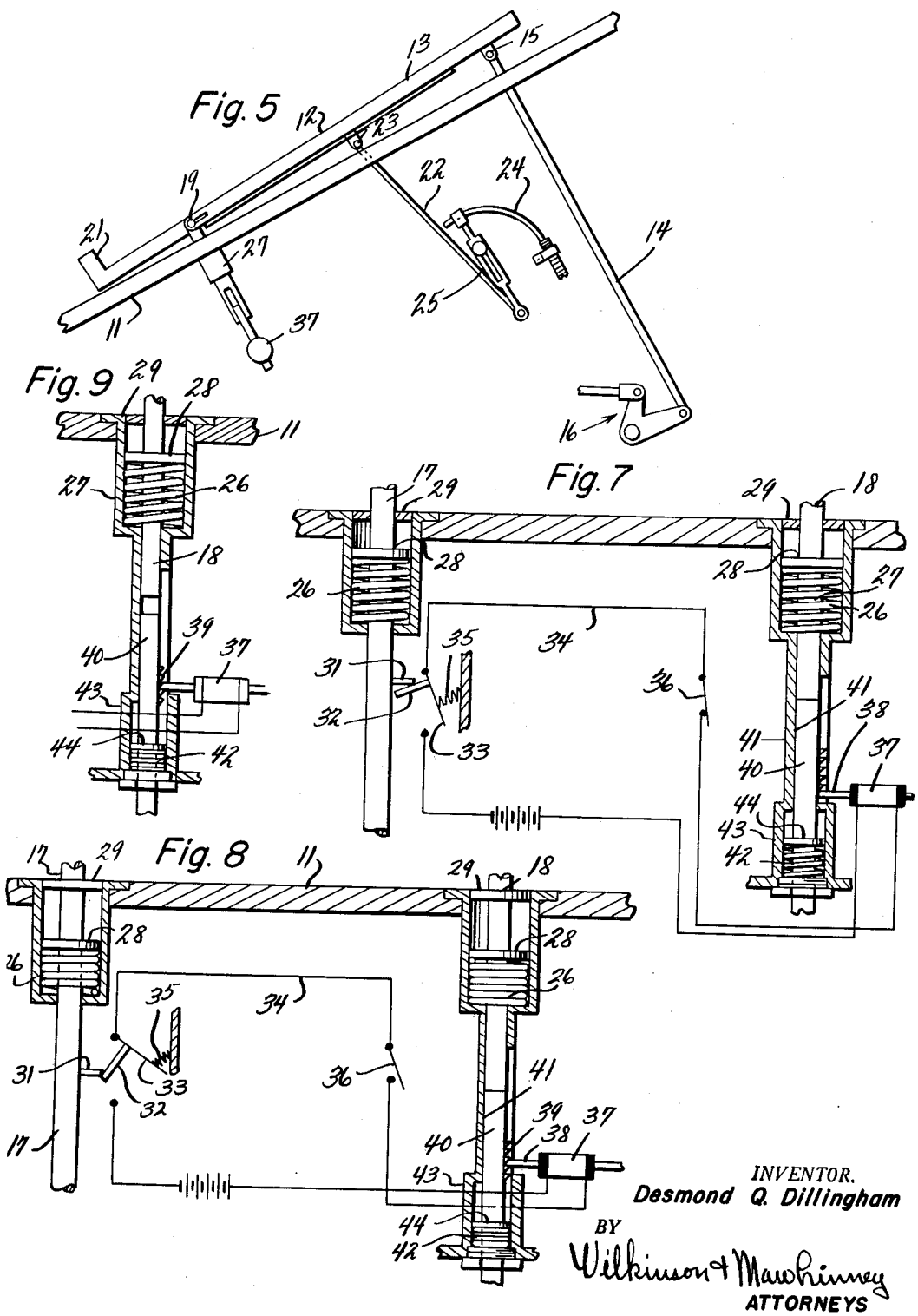

United States Patent Office 2,725,962
Patented Dec. 6, 1955

2,725,962

COMBINATION ACCELERATOR, SERVICE AND EMERGENCY BRAKE CONTROLS AND MOTOR IGNITION CIRCUIT CUT-OUT FOR AUTOMOTIVE VEHICLES

Desmond Q. Dillingham, Memphis, Tenn.

Application March 12, 1954, Serial No. 415,826

4 Claims. (Cl. 192—3)

The present invention relates to a combination accelerator, service and emergency brake controls and motor ignition circuit cut-out for automotive vehicles in which the accelerator and brake pedals are so combined and related that the same depressing movement of a single foot of the vehicle operator will suffice to close the throttle valve, apply the service brake, make application of the emergency brake and open the motor ignition circuit, selectively or in sequence.

The purpose of the invention is to centralize all phases of motor vehicle control operation so that the element of lost motion is eliminated by being able to keep one foot at all times on a single control pedal assembly to avoid the time lag of shifting the foot from one to another of separate side by side accelerator and brake pedals.

A further object of the invention is to secure substantially simultaneous braking with deceleration and if desired simultaneous applications of both service and emergency brakes, and motor ignition circuit cut-out either simultaneously or subsequently to emergency brake application.

A further object of the invention is to provide for discontinuance of motor operation and opening of the motor ignition circuit in emergency to eliminate or largely reduce the fire hazard.

With the foregoing and other objects in view, the invention will be more fully described hereinafter and more particularly pointed out in the appended claims.

In the drawings in which like parts are denoted by the same reference characters throughout the several views:

Figure 1 is a fragmentary isometric view of a motor vehicle operator's compartment illustrating a form of combination accelerator, service and emergency brake controls and motor ignition circuit cut-out constructed in accordance with the present invention.

Figure 2 is a vertical longitudinal sectional view taken on the line 2—2 of Figure 1 showing the accelerator pedal in partially open position.

Figure 3 is a similar view with the accelerator pedal closed and accommodated into the plane of the brake pedal.

Figure 4 is a similar view showing the brake pedal depressed to make a service brake application, while the throttle valve control remains closed.

Figure 5 is a similar view showing the brake pedal further depressed at its lower portion to effect an emergency brake application and opening of the motor ignition circuit.

Figure 6 is a transverse sectional view taken on an enlarged scale on the line 6—6 of Figure 1 showing the raised position of the brake pedal and the closed condition of the motor ignition circuit.

Figure 7 is a similar view with the brake pedal removed and the parts depressed to a position opening the motor ignition circuit.

Figure 8 is a similar view showing the further depressed position of the parts to interlocked emergency brake application, and Figure 9 is a similar view of the emergency brake connection leg with the brake connection still interlocked and the brake pedal rod partially raised.

Referring more particularly to the drawings which illustrate a single embodiment of the invention, 10 and 11 designate the dash and toe floor boards of a conventional automobile and 12 and 13 the accelerator and brake pedals respectively.

The forward portion of the brake pedal 13 is mounted to the service brake rod 14 by a pivot 15, the rod 14 being slidable through the floor board 11 and coupled to the service brake linkage 16. The rear end portion of the brake pedal 13 is mounted to the rear rods 17 and 18 by the pivots 19. The rods 17 and 18 are also slidable through the floor board 11.

The pivots 19 may also serve to mount the accelerator pedal 12 upon the brake pedal 13 or rear rods 17 and 18 with a forward sole and toe portion adapted to be accommodated into the plane of the brake pedal 13 and into a cut-away portion 20 thereof and with a heel portion of the accelerator pedal 12 extending back of the pivot axis 19 for depressing by the heel of the operator to open the throttle valve. An upturned flange 21 on the rear edge of the accelerator pedal 12 provides a heel rest.

A rod 22 is pivoted at 23 beneath the forward portion of the accelerator pedal 12 and extends slidably through the floor board 11 to connect therebeneath with the throttle valve connection or linkage 24 including a lost-motion link 25.

The brake and accelerator pedal assembly is biased to an elevated position by coil springs 26 installed beneath the floor board 11 in housings 27. The springs 26 are helically wound about the rods 17, 18 with their lower ends abutting the lower ends of the housings 27 and their upper ends engaging collars 28 fixed to the rods 17, 18. The springs 26 are arrested in expanded position by the engagement of the collars 28 against the stops or housing covers 29 which are perforated for the slidable passage of the rods 17, 18. A similar coil spring 30 may be installed between the floor board 11 and forward end portion of the brake pedal 13 to assist in raising the pedals when foot pressure is released therefrom.

As shown in Figures 6, 7 and 8 the lower part of rod 17 below its housing 27 carries a finger 31 disposed to encounter a switch finger 32 on a switch 33 in the motor ignition circuit 34, which switch 33 is biased to closed position by a spring 35. The conventional ignition switch is shown at 36. The ignition circuit 34 may also include a solenoid 37 having a spring-projected core or plunger 38 positioned to engage and interlock with a series of ratchet teeth 39 on an emergency brake rod 40 connected at its lower end to the conventional emergency brake. The rods 18 and 40 are arranged in axial alinement being guided in their movements by a casing 41. A spring 42 normally releases the emergency brake by moving the rod 40 up into contact with the rod 18, such spring 42 seats at its lower end at the bottom of housing 43 through which rod 40 freely slides and abuts at its upper end against a collar 44 fixed to rod 40. The upper end of the housing 43 forms a stop for the collar 44 and release spring 42.

The teeth 39 and free end of plunger 38 are beveled or inclined in a direction to permit free descent of the rod 40 in the application of the emergency brake but to lock the rod 40 against return upward movement and the applied emergency brake against release until the solenoid 37 is energized to withdraw the plunger 28 from its locked engagement with the rod 40. A manual release 45 is also connected to the spring-projected plunger 38 and may extend to the instrument panel where the ignition switch 36 is customarily located.

In operation, Figures 1, 2 and 6 show the pedal assembly elevated with the brakes off, the ignition circuit closed and the accelerator pedal 12 rocked to position to open the throttle valve. By depressing the heel the rod 22 is lifted to open the throttle valve to the desired degree incident to normal driving operation.

In slowing or stopping, the actions of deceleration and service brake application are coordinated in that foot pressure downwardly upon the brake pedal 13 will automatically cause the accelerator pedal 12 to first assume the position of Figure 3 to reduce the motor to idlying movement and then the brake pedal to be depressed (Figure 4) to actuate the service brake.

If these combined actions are ineffective to halt the vehicle under any abnormal conditions the brake pedal 13 may be rocked down to the position of Figure 5.

In moving to the position of Figure 5, the rear rods 17, 18 move in sequence through the two positions shown in Figures 7 and 8. In Figure 7 the finger 31 has engaged and displaced finger 32 opening the switch 33 and interrupting the motor ignition circuit thereby stopping the motor. In Figure 5 the springs 26 and 42 have been partially compressed and the lowermost tooth 39 brought down against the free end of the plunger 38.

As the brake pedal 13 is further rocked down (Figure 5) the rods 17, 18 are lowered to the position of Figure 8 making maximum application of the emergency brake, compressing springs 26 and 42 to substantially shut height and moving the teeth 39 into interlocking engagement with the solenoid plunger 38. The emergency brake will remain applied due to this locked condition until released manually or by energizing the solenoid.

When foot pressure is released from the brake pedal 13 the springs 26 and 30 will elevate the rods 17 and 18 but as shown in Figure 9 the rod 40 will remain in the lower locked position until the solenoid 37 is energized which may autoamtaically occur when the finger 31 has been raised sufficiently to permit spring 35 to again close switch 33, that is if in the meantime the operator has not opened the ignition switch 36.

When automobiles are stopped and parked the emergency brake is applied by hand after the ignition circuit is opened by turning off the ignition key switch. The invention has the further advantage that when the operator returns to the vehicle and prepares to drive it off he can never do so with the emergency brake still applied because as soon as he turns the key in the ignition switch lock the solenoid 37 will be energized to withdraw the locking plunger 38 from the teeth 39 thus freeing the rod 40 to the action of the spring 42 and automatically releasing the emergency brake.

It will be appreciated that the four operations of deceleration, service brake application, motor cut-out, and finally emergency brake application can all be performed in that sequence by the continuance of the same foot movement in the same direction to the end that all phases of automotive control are performed simply and in a minimum of time whereby safety in driving is promoted to a high degree.

As shown in Figures 1 and 2, a flange 50 on the brake pedal 13 projects in to the cut-away portion in position to be encountered by the accelerator treadle when the same is moved down forwardly flush with the brake pedal 13. This flange 50 prevents the passage of the accelerator pedal 12 beyond the point where it becomes level with the top of the brake pedal 13. The incorporation of this flange affords even braking pressure regardless of foot placement so long as a portion of the foot is forward of the pivots 19.

While I have disclosed herein the best form of the invention known to me at this time, it will be understood by those skilled in this art that various mechanical and electrical modifications may be made in the herein disclosed form without departing from the spirit of the invention.

What is claimed is:

1. For use in an automotive vehicle having service brakes, emergency brakes, a motor ignition circuit and a throttle valve, a control comprising a brake pedal adapted to cooperate with said brakes and movable in one direction to make service brake applications and in another direction to make emergency brake applications, means adapted to cooperate with the ignition circuit and operated by said brake pedal in the emergency brake application direction and subsequent in time to the application of the emergency brake to open the motor ignition circuit, and an accelerator pedal adapted to cooperate with the throttle valve and moving with and relatively to said brake pedal to operate the throttle valve.

2. For use in an automotive vehicle having service brakes, emergency brakes and a motor ignition circuit, a control comprising means adapted to cooperate with said brakes for making selectively service and emergency brake applications, a connection to said means adapted to cooperate with the circuit for opening the motor ignition circuit, and means adapted to cooperate with the circuit for automatically closing the ignition circuit when said first named means is released.

3. For use in an automotoive vehicle having a motor ignition circuit and emergency brakes, a control comprising a switch adapted to be placed in the motor ignition circuit biased to closed position, means adapted to cooperate with the brakes to make emergency brake applications having a part in the path of said switch to open the same, a latch to hold the brake in applied position, and means energized on closing of the ignition circuit to release said latch.

4. For use in an automotive vehicle having a braking system and a throttle mechanism, a pedal adapted to be connected to the braking system of the vehicle and having a cut-away portion with a flange at the lower portion thereof, and an accelerator pedal pivoted to the brake pedal and adapted to move into such cut-away portion and against said flange as a stop to arrest further downward movement of the accelerator pedal and to entrain both pedals for simultaneous further downward movement irrespective of foot placement, and means adapted to connect the accelerator pedal to the throttle mechanism.

References Cited in the file of this patent

UNITED STATES PATENTS

| | | |
|---|---|---|
| 979,938 | Eiselt | Dec. 27, 1910 |
| 1,497,127 | White | June 10, 1924 |
| 1,586,192 | Fuge | May 25, 1926 |
| 2,082,583 | Lindbloom | June 1, 1937 |
| 2,532,357 | Callender | Dec. 5, 1950 |
| 2,553,080 | Ching | May 15, 1951 |
| 2,643,746 | Righter | June 30, 1953 |